United States Patent [19]

Schneider

[11] 4,384,541

[45] May 24, 1983

[54] CUSHIONED UPHOLSTERY MATERIAL

[76] Inventor: Charles Schneider, 314 S. 67th St., Omaha, Nebr. 68132

[21] Appl. No.: 261,660

[22] Filed: May 7, 1981

[51] Int. Cl.³ .......................... D05B 97/00; B32B 7/08
[52] U.S. Cl. ............................... 112/421; 112/262.1; 112/440
[58] Field of Search .............. 112/421, 427, 440, 441, 112/262.1; 5/481; 428/310

[56] References Cited

U.S. PATENT DOCUMENTS

| | | | |
|---|---|---|---|
| 2,458,588 | 1/1949 | Gordon et al. | 112/440 X |
| 2,831,532 | 4/1958 | Kasper | 5/481 |
| 3,293,671 | 12/1966 | Griffin | 5/481 |
| 3,335,435 | 8/1967 | Marsh et al. | 5/481 |
| 3,337,884 | 8/1967 | Meier | 5/481 |
| 3,563,837 | 2/1971 | Smith et al. | 112/420 |

Primary Examiner—H. Hampton Hunter
Attorney, Agent, or Firm—George R. Nimmer

[57] ABSTRACT

For high quality handcrafted furniture, cushioned upholstery (comprising a field of padded chambers respectively delineated by attractive deep channels) provides a luxurious external appearance. Cushioned upholstery material of the prior art is traditionally of the "discretely individually stuffable pockets" type. The cushioned upholstery material described herein differs markedly from the prior art in that pocket means is unnecessary, but rather, a relatively broad and thick piece of laminar resiliently compressible foam sheeting is stitchably incorporated into a plurality (and possibly even all) of the field padded chambers, the stitching rows also providing improved deep channel delineations for the resultant multi-chambered cushioned upholstery material.

8 Claims, 6 Drawing Figures

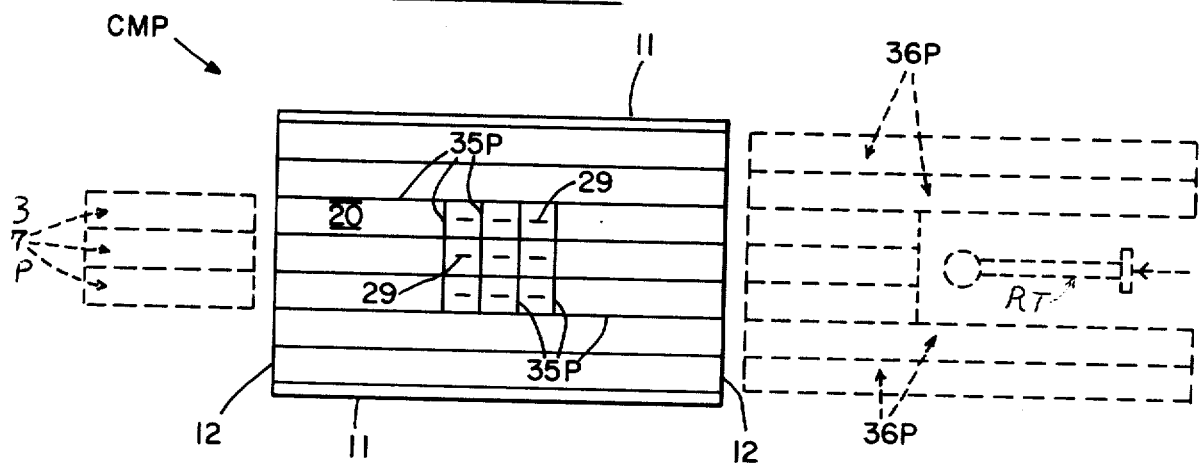
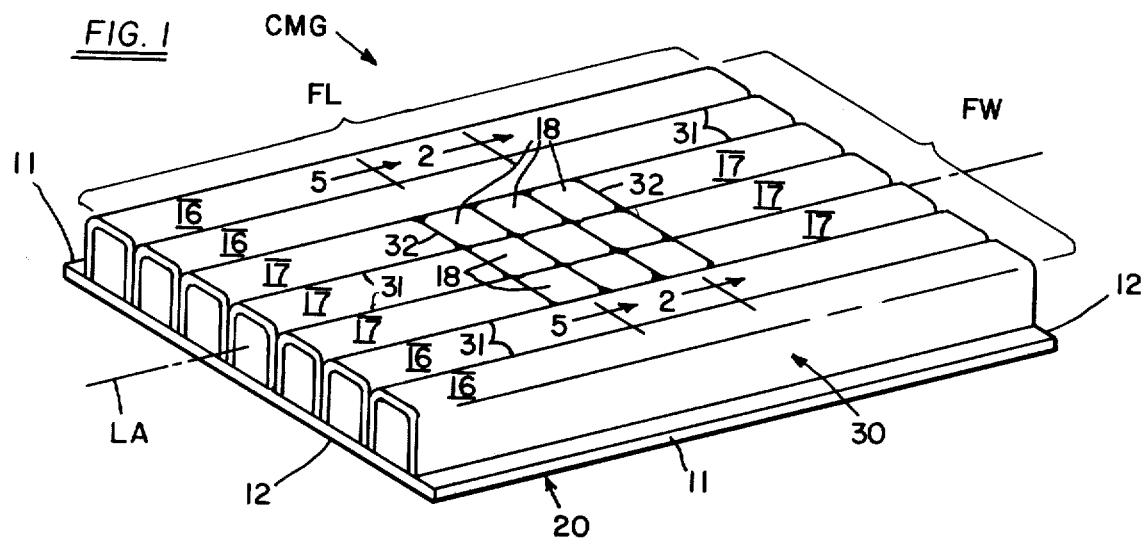
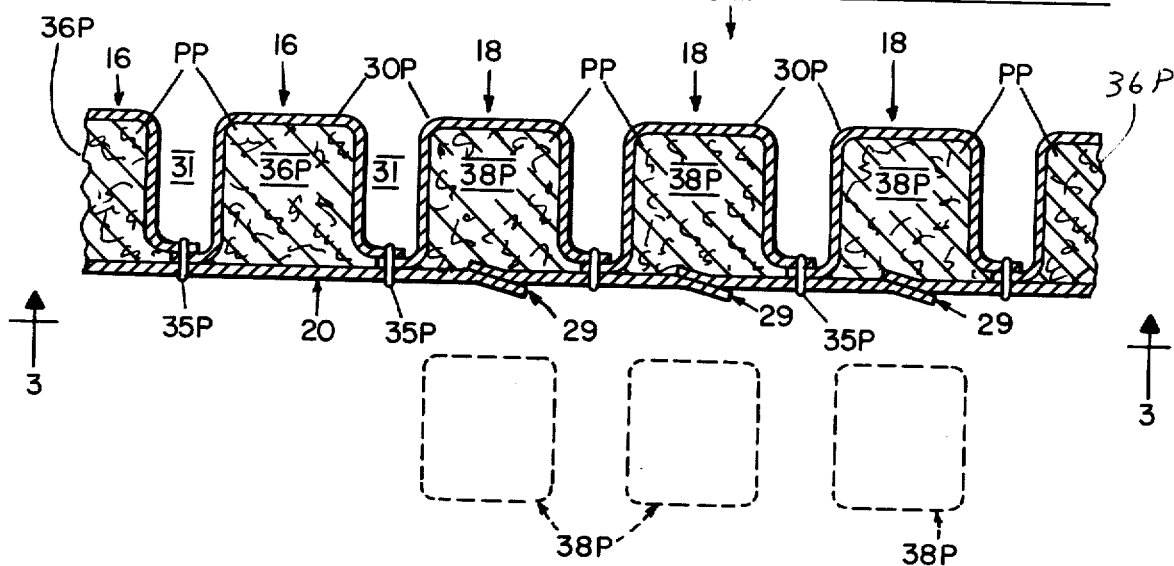

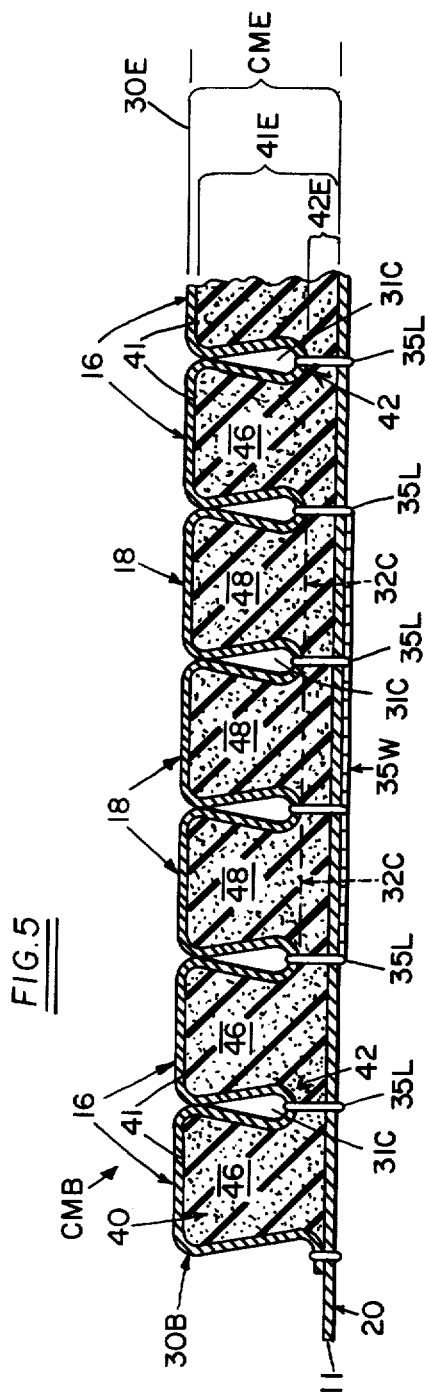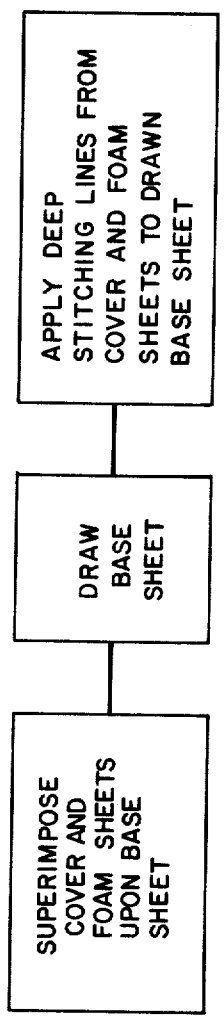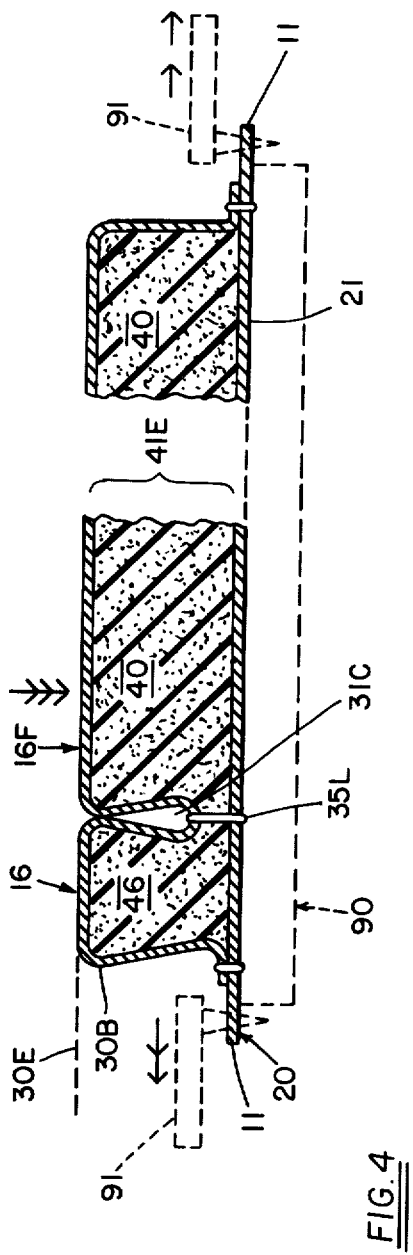

CUSHIONED UPHOLSTERY MATERIAL

Cushioned upholstery material, comprising a field of resiliently padded chambers respectively delineated by deep channels, is oftentimes employed to provide a luxurious external appearance for high quality handcrafted furniture. The deep channeling, which delineates the padded chambers, most commonly are unidirectionally parallel to define a field of elongated padded chambers. Sometimes, transversely extending intersecting channeling is additionally employed to define a "waffle-like" field of nodular padded chambers.

Schematically indicated in a general sense in FIG. 1 is representative cushioned upholstery material "CMG" extending lengthwise a finite-length "FL" along longitudinal-axis "LA" between transverse-ends 12 and having lengthwise-borders 11 at a finite-width spacing "FW". The underside is provided by horizontal laminar base sheet 20 and the upperside is provided by laminar decorative cover sheet 30. FIG. 1 arbitrarily selects for depiction a field of nineteen padded chambers (16,17,18) delineated by ten cover sheet channels (31,32) including: four very lengthy longitudinal chambers 16 of finite-length "FL" and delineated by longitudinal channels 31; six longitudinally shorter chambers 17 delineated by longitudinal channels 31 and terminating at a transverse channel 32; and nine nodular chambers 18 delineated by intersecting channels 31 and 32.

As indicated in drawing FIGS. 2 and 3, prior art cushioned upholstery material is prevalently of the "discretely individually stuffable pockets" type. Such prior art upholstery material is typically fabricated by sewing (35P) a gathered decorative cover (30P), as one or more pieces, to underlying flat base sheet 20, whereby individual internal pockets ("PP") are formed. In FIG. 3, eleven stitching rows (eight longitudinal and four transverse) join base 20 to cover 30P to provide nineteen stuffable pockets "PP". Subsequently, resilient padding (36P,37P,38P) is manually forceably stuffed (as by ram tool "RT") into each separately distinct individual pocket "PP" to swell the cover member undulations and provide the nineteen padded chambers. The same pocket-forming stitching rows 35P provided the cushioned upholstery material with the pocket-and-chambers channel delineations (31P, 32P). As indicated by phantom lines in FIG. 3, the assigned padding pieces 36P and 37P for lengthy chambers 16 and 17 might be stuffed from the transverse-ends 12. However, to make the nine nodular chambers 18, the base sheet 20 needs to be provided with nine slits 29 to permit insertion of the nine assigned padding pieces 38P. These slits 29, used to gain access for stuffing the pockets, are usually subsequently closed by manual sewing.

"Discretely individually stuffable pockets" type cushioned upholstery material suffers from the following disadvantages and deficiencies. It is exceedingly expensive to fabricate because its cumbersome physical structure requires highly skilled and physically demanding tedious labor. Its cumbersome structure having individual pockets, with resilient padding subsequently stuffably inserted according to the operator's discretion, results in considerable variation of cushioning resiliency among padded chambers of the same upholstered furniture article. Because of its inherent pocketed form, the distinctly discrete pieces of resilient padding within the respective chambers have a tendency to bunch or creep thereby detracting from the aesthetics and comfort of the furniture article covered therewith. The channeling delineating the respective pocket-like chambers in apt to lack uniformity of depth and appearance.

It is accordingly the general objective of the present invention to provide cushioned upholstery material that overcomes the disadvantages and deficiencies of the prior art. Ancillar general objectives include: attaining non-shifting resilient internal cushioning having heretofore unattainable uniformity of contour and resiliency among all the padded chambers; aesthetically appealing deep channeling having unusual depth and narrow width, yet without detracting from the upholstery material physical strength and wear resistance; and high quality reliable cushioned upholstery with chambers delineating deep channeling that can be fabricated inexpensively and rapidly according to preselected specifications and designs.

With the above and other objects and advantages in view, which will become more apparent as this description proceeds, the cushioned upholstery material having channel delineated padded chambers generally comprises: a horizontal flexible base sheet substantially planar throughout and providing the upholstery lower-face; a resiliently compressible flexible foam sheet overlying the base sheet, said foam sheet in its non-compressed form having a regular finite-thickness and providing at least three-fourths the upholstery material finite-height and the chambers padding; a decorative flexible cover sheet overlying the foam padding sheet and providing for the upholstery material a generally horizontal upper-face that is periodically interrupted by deep channeling, the nadir of each cover sheet channel being held downwardly against pinched foam by a stitching row secured to the base sheet; and there being a plurality of stitching rows, preferably visually obscured by the padded chambers, securing the compressive foam sheet to the cover and base sheets without weakening the foam nor detracting from the resiliency of chambers delineated by the stitched channeling.

In the drawing, wherein like characters refer to like parts in the several views, and in which:

FIG. 1 is a perspective view schematically depicting the general subject matter herein, namely a length of generic form cushioned upholstery material having channel delineated padded chambers, the material being ready for installation as cushioned upholstery;

FIG. 2 is a sectional elevational view taken along line 2—2 of FIG. 1 showing a representative form of prior art "pockets" type cushioned upholstery material;

FIG. 3 is a bottom plan view of the FIG. 2 prior art cushioned upholstery material at an intermediate stage of fabrication;

FIG. 4 is a sectional elevational view similar to FIG. 5 showing the FIG. 5 cushioned upholstery material at an intermediate stage of fabrication;

FIG. 5 is a sectional elevational view similar to FIG. 2 and taken along line 5—5 of FIG. 1 showing a representative embodiment of the cushioned upholstery material of the present invention; and FIG. 6 is a flow diagram schematically depicting the fabrication of the cushioned upholstery material of the present invention.

As is immediately apparent from FIG. 5, which depicts a representative embodiment "CMB" of the cushioned upholstery of the present invention, discretely stuffable individual pockets are not utilized as the padded chambers (16,17,18). But rather, it is clear from the FIG. 5 sectional elevational view that a single broad padding (40) sheet of resiliently compressible foam, sandwiched between base (20) and decorative cover (30B) sheets, is distributed among a plurality of the chambers as the resiliently compressible padding therefor.

Flexible foam sheet 40 in its non-compressed state has a regular finite-thickness 41E which is a multiple of the aggregate thickness of the flexible base and cover sheets. Foam sheet 40 is secured to the substantially planar base sheet 20 and also to the cover sheet 30B with a plurality of longitudinally extending tight stitching rows 35L. Thus, foam sheet 40 is held in downwardly compressed pinched condition at a pinched-thickness 42E by the tight stitching rows 35L. Pinched-thickness 42E is desireably less than one-fourth the finite-thickness 41E, whereby the cover sheet 30B along the deeply emplanted stitching rows 35L provides the deep channels 31C. Though the decorative cover sheet 30B provides the upholstery material upper-face (lying along generally horizontal plane 30E), by virtue of the deeply emplanted (42E) tight stitching rows 35L, cover 30B is periodically interrupted by its deep channeling 31C. The nadir of each channel 31C lies much closer to the upholstery material lower-face 21 than to the upper-face 30E, said nadir being provided by cover sheet 30B.

As alluded to in the FIG. 5 description of the immediately preceeding paragraph, the deeply emplanted tight stitching rows 35L occupy field locations analagous to the longitudinally extending stitching rows 35P seen in FIG. 2. Similarly, channels 31C occupy chamber delineating locations analagous to the channels 31 seen in FIG. 2. However, a further comparison of FIGS. 2 and 5 readily reveals the following differences. Unlike the discrete removable stuffing 36P and 38P for the pocket-like ("PP") irregularly padded chambers 16 and 18 of FIG. 2, in FIG. 5 the chambers 16 and 18 are uniformly inflatably swelled by the non-compressed foam lengths 46 and 48. In a related vein, the non-foam irregular padding 36P and 38P of FIG. 2 results in a non-aesthetic top plan view exposure of the stitching rows 35P; but, the selection of highly resilient foam 40 for upholstery "CMB" will permit neighboring chambers to physically contact thus aesthetically obscuring the stitching rows 35L and 35W from the top plan observer. Unlike the absence of padding along the stitching rows 35P and channels 31 of FIG. 2, in FIG. 5 pinched foam 42 extends also along stitching rows 35L beneath the deep channels 31C. In a related vein, the removable pocketed padding 36P and 38P of FIG. 2 is free to bunch and creep within the chambers; but, the non-severed lines of pinched foam 42 prevent longitudinal withdrawal of the foam padding 46-48 from chambers 16-18, and hence, also prevents bunching a creeping within the chambers.

Employable analagously to the channel-forming and foam-pinching tight stitching rows 35L are similar stitching rows 35W which transversely intersect axis "LA" and which might also transversely intersect an empirically selected plurality of longitudinally extending stitching rows (35L). Through such empirical selection, and through a further selection of the paths taken by the respective stitching rows 35L and 35W, the sizes and shapes of the padded chambers occuppying the upholstery field can be arbitrarily selected. As one non-limiting example, the character 32C in FIG. 5 refers to transversely extending channels delineating nodular chambers 18 and the terminus of longitudinal chambers 17.

The necessarily deeply emplanted tight stitching rows 35L and 35W and the necessarily resiliently compressible foam sheet 40 have the tendency to undulate the necessarily flexible base sheet (20), thereby debilitating the spatial relationship parameters deemed necessary for the improved cushioned upholstery material e.g. "CMB". However, to prevent such base sheet inimical undulations, it must be maintained in a horizontally drawn condition while the stitching lines 35L and 35W are being deeply implanted. As alluded to in phantom lines in drawing FIG. 4, the three superimposed flexible sheets (e.g. 20,30B,40) rest upon the horizontal table of an industrial sewing machine, base sheet 20 being drawn across the table 90 in horizontal directions (as indicated by double-headed arrows) with suitable stretchable means (91) removably engageable with the base sheet (20). In FIG. 4, the first longitudinal stitching line 35L has already been deeply emplanted to provide first deep channel 31C alongside first padded chamber 16, and the second longitudinal stitching line 35L is ready to be deeply emplanted (as indicated by triple-headed arrow) to provide a second deep channel along proposed second parallel chamber 16F. The process repeats itself according to the arbitrarily selected design plan for the field of padded chambers for the cushioned upholstery material.

From the foregoing, the construction, fabrication, and use of the cushioned upholstery material will be readily understood and further explanation is believed to be unnecessary. However, since numerous modifications and changes will readily occur to those skilled in the art it is not desired to limit the invention to the exact construction shown and described, and accordingly, all suitable modifications and equivalents may be resorted to, falling within the scope of the appended claims.

What is claimed is as follows:

1. Cushioned upholstery material extending lengthwise along a longitudinal-axis including a channeled upper-face and a substantially planar lower-face and also including a field of padded chambers respectively delineated by said deep channels, said cushioned upholstery material also including a pair of longitudinally extending and finite-width transversely separated borders, said cushioned upholstery material being of laminar construction comprising three flexible sheets as underlying base, intermediate foam, and decorative cover sheets strategically joined together with deep stitching rows that also provide deep channel delineations for padded chambers and wherein:

A. said base sheet is substantially planar and provides said substantially planar lower-face for the cushioned upholstery material;

B. said cover sheet provides the upholstery material upper-face and deep channels delineations for respective padded chambers;

C. said foam sheet is a resiliently compressible foam sheet having a regular finite-thickness that in its noncompressed state exceeds the aggregate thickness of base and cover sheets, said foam sheet being sandwiched between the base and cover sheets and being secured thereto in pinched condition with a plurality of said stitching rows, said foam sheet along at least two separated stitching rows having a pinched-thickness less than about one-fourth the noncompressed finite-thickness, noncompressed foam between neighboring stitching rows paddably inflating the resultant inter-stitches resultant chambers whereby said cover sheet along stitching rows overlies the pinched rows of the foam sheet and is at the nadir of deep channels delineating the foam padded chambers; and D. said stitched channel nadir being located nearer to the base sheet than to the non-channeled upper-face plane of the cover sheet.

2. The cushioned upholstery material of claim 1 wherein the majority of the separated stitching rows are longitudinally extending whereby a majority of the padded chambers provided by the periodically longitudinally stitchably pinched foam sheet are unidirectionally parallel.

3. The cushioned upholstery material of claim 2 wherein the periodically pinched foam remains unsevered by the foam pinching stitching rows whereby longitudinal forces exerted to the foam padding of a selected chamber is disengageable from the cushioned upholstery material.

4. The cushioned upholstery material of claim 3 wherein the longitudinally extending stitching rows are intersected by a plurality of transversely extending stitching rows whereby the upholstery field includes a plurality of nodular padded chambers formed by said plurally pinched foam sheet.

5. The cushioned upholstery material of claim 1 wherein the foam sheet is of such compressible resiliency and the stitching rows are so deeply set toward the base sheet that neighboring padded chambers are in physical contact along said channel delineations above the stitching row whereby said stitching row is obscured in top plan view.

6. The method of making cushioned upholstery material, said method comprising the following steps:
  i. superimposing a resiliently compressible foam sheet upon a flexible base sheet, and superimposing a decorative cover sheet upon the foam sheet, the foam sheet being selected having a regular finite-thickness that in its noncompressed state exceeds the aggregate thickness of the base and cover sheets;
  ii. drawing the base sheet, but not the foam and cover sheets, into a taut horizontal condition across a sewing machine table; and
  iii. applying a plurality of longitudinally extending and transversely separated deep stitching rows through the taut base, and the loose foam and cover sheets, to cause coextensive longitudinal pinching of the intermediate foam sheet whereby a plurality of longitudinally extending foam padded chambers, respectively delineated by the deeply set stitching rows channels, results.

7. The method of claim 6 wherein the foam resiliency and the stitching tension are selected at high values to provide the nadir of cover sheet channeling nearer to the base sheet than to the upper-face plane of the cover sheet whereby physical contact of the foam padded chambers results above the stitching row.

8. The method of claim 7 comprising the further step of applying additional stitching rows respectively transversely intersecting a plurality of longitudinal stitching rows to provide a plurality of nodular foam padded chambers.

* * * * *